US009994447B2

(12) United States Patent
Bossard

(10) Patent No.: US 9,994,447 B2
(45) Date of Patent: Jun. 12, 2018

(54) INTEGRATED MICRO-CHANNEL REFORMER AND PURIFIER IN A HEAT PIPE ENCLOSURE FOR EXTRACTING ULTRA-PURE HYDROGEN GAS FROM A HYDROCARBON FUEL

(71) Applicant: Power & Energy, Inc., Ivyland, PA (US)

(72) Inventor: Peter R. Bossard, Ivyland, PA (US)

(73) Assignee: Power & Energy, Inc., Ivyland, PA (US)

( * ) Notice: Subject to any disclaimer, the term of this patent is extended or adjusted under 35 U.S.C. 154(b) by 257 days.

(21) Appl. No.: 14/925,944

(22) Filed: Oct. 28, 2015

(65) Prior Publication Data

US 2016/0115019 A1    Apr. 28, 2016

Related U.S. Application Data

(60) Provisional application No. 62/069,823, filed on Oct. 28, 2014.

(51) Int. Cl.
 *C01B 3/34* (2006.01)
 *H01M 8/06* (2016.01)
 *H01M 8/0612* (2016.01)
 *H01M 8/0662* (2016.01)

(52) U.S. Cl.
 CPC ............ *C01B 3/34* (2013.01); *H01M 8/0618* (2013.01); *H01M 8/0687* (2013.01); *C01B 2203/0216* (2013.01); *C01B 2203/085* (2013.01); *C01B 2203/0811* (2013.01)

(58) Field of Classification Search
 CPC ................................ C01B 3/503; C01B 3/505
 See application file for complete search history.

(56) References Cited

U.S. PATENT DOCUMENTS

| 4,315,893 A * | 2/1982 | McCallister ........... B01J 8/1836 252/373 |
| 8,889,098 B1 | 11/2014 | Bossard et al. |
| 2003/0159354 A1* | 8/2003 | Edlund .................... B01J 8/009 48/127.9 |

* cited by examiner

*Primary Examiner* — Matthew J Merkling
(74) *Attorney, Agent, or Firm* — LaMorte & Associates, P.C.

(57) ABSTRACT

The present invention is a system and method of heating a reaction cell that produces hydrogen from a mixture of hydrocarbon fuel and steam. The reaction cell contains a first tube of hydrogen permeable material and a second tube of hydrogen impermeable material. The first tube and the second tube are concentrically positioned so that a gap space exists between the two tubes. A heat pipe structure is utilized to heat the gap space. The heat pipe structure defines an enclosed vapor chamber. A volume of a multi-phase material is disposed within the vapor chamber. The multi-phase material changes phase between a liquid and gas within an operating temperature range. A heating element is used to heat the vapor chamber to the operating temperature range. The vapor chamber transfers heat along its length in the same manner as a heat pipe.

14 Claims, 3 Drawing Sheets

INTEGRATED MICRO-CHANNEL REFORMER AND PURIFIER IN A HEAT PIPE ENCLOSURE FOR EXTRACTING ULTRA-PURE HYDROGEN GAS FROM A HYDROCARBON FUEL

RELATED APPLICATIONS

The application claims priority from provisional patent application No. 62/069,823, filed Oct. 28, 2014.

BACKGROUND OF THE INVENTION

1. Field of the Invention

In general, the present invention relates to systems and methods that are used to steam reform hydrocarbons to generate a volume of hydrogen rich gases and then separate the hydrogen from such gases for separate use. More particularly, the present invention relates to the structure of reaction chambers where gas shift reactions are produced and where hydrogen permeable membranes are used to separate hydrogen gas.

2. Prior Art Description

In industry, there are many applications for the use of ultra pure hydrogen. For instance, there are many PEM fuel cells that operate using hydrogen. The hydrogen, however, must be ultra pure. In the art, ultra pure hydrogen is commonly considered to be hydrogen having purity levels of at least 99.999%. Any molecules of carbon dioxide, carbon monoxide or other contaminant gases that are received by the fuel cell either reduces its efficiency or causes damage to the fuel cell.

Free hydrogen gas does not exist naturally on earth to any significant extent. This is because hydrogen reacts with many elements and readily combines to form more complex molecules. As a consequence, hydrogen gas must be manufactured by removing it from other more complex molecules. Hydrogen gas can be manufactured in a number of ways. For instance, hydrogen gas can be created by splitting water molecules through electrolysis. However, the power needed for electrolysis is always significantly greater than the power available from a fuel cell that utilizes the output hydrogen gas from the electrolysis. Any fuel cell system that obtains hydrogen gas from electrolysis, therefore, results in a net power loss.

Techniques have been developed where hydrogen gas can be extracted from a hydrocarbon fuel and water mixture that has undergone an endothermic reaction. This initial endothermic reaction occurs between 350° C. and 1000° C. depending mostly on the initial hydrocarbon fuel being used. In the steam reforming process, the hydrocarbon fuel and water are converted in an endothermic reaction principally into hydrogen ($H_2$), carbon monoxide (CO), methane ($CH_4$), carbon dioxide ($CO_2$) and water ($H_2O$). The amount of energy required depends on the type of fuel being reformed. In steam reforming, a principal challenge is efficiently supplying the endothermic energy as the cracking of the fuel and steam proceeds.

The useful chemical energy in the resultant gases is contained in the $H_2$, CO, $CO_2$ and $CH_4$. The chemical energy in these three resultant gases contains the chemical energy that was originally in the hydrocarbon fuel, plus some of the endothermic energy that was used to heat the reaction.

The resultant gases of $H_2$, $CH_4$, CO and $CO_2$ are mixed with steam at an elevated temperature typically of between 300° C. and 450° C. In this temperature range, a water gas shift reaction is induced. Once the water gas shift reaction is induced, the CO present in the resultant gases reacts with the water ($H_2O$). The CO and the $H_2O$ react as follows:

$$CO + H_2O \rightarrow CO_2 + H_2$$

It can therefore be seen that additional hydrogen gas is created by the water gas shift reaction. The hydrogen gas is then purified by drawing the hydrogen gas through a hydrogen permeable membrane in a hydrogen separator. The purified hydrogen can then be used to power a fuel cell or serve some other industrial purpose.

In the prior art, obtaining purified hydrogen from a hydrocarbon is typically a two-step process. In the first step, the hydrocarbon is reacted with water in a reaction chamber to create reaction gases. In a second step, the reaction gases are introduced into a hydrogen separator in order to separate out the purified hydrogen. In production, the two most important and expensive components in generating hydrogen are the reactor and the separator. Although these components are separate in the prior art, it has been learned that significant cost savings and efficiencies can be obtained by integrating the reaction chamber and the hydrogen separator into a single integrated component.

In U.S. Pat. No. 8,889,098, the Applicant herein set forth a design for a hydrogen processor that integrates a reaction chamber and a separator into a single unit that utilizes concentric tubes. In the Applicant's earlier patent, the hydrogen processor is heated by orienting the concentric tubes vertically and providing a flame under the bottom end of the concentric tubes. In theory, the heat from the flame should travel up along the exterior of the tube formation to heat the full length of the tube formation. However, in practice this heating scheme has flaws. Inevitably, the end of the tube formation closest to the flame becomes hotter than the rest of the tube. The remainder of the tube becomes cooler the further it travels from the source of the flame. As a result, in order to have a hydrogen processor with an average optimal operating temperature, that hydrogen processor will embody sections that are both cooler and hotter than the average optimal temperature. This uneven temperature detracts from the efficiency of the hydrogen processor.

A need therefore exists for a design of an integrated hydrogen processor with an improved heating scheme that can efficiently maintain a selected operating temperature during operation. This need is met by the present invention as described and claimed below.

SUMMARY OF THE INVENTION

The present invention is a system and method of heating a reaction cell that produces hydrogen from a mixture of hydrocarbon fuel and steam. The reaction cell contains a first tube of hydrogen permeable material and a second tube of hydrogen impermeable material. The first tube and the second tube are concentrically positioned so that a gap space exists between the two tubes.

A heat pipe structure is formed around the second tube. The heat pipe structure defines an enclosed vapor chamber. A volume of a multi-phase material is disposed within the vapor chamber. The multi-phase material changes phase between a liquid and gas within an operating temperature range. A heating element is used to heat the vapor chamber to the operating temperature range. The vapor chamber transfers heat along its length in the same manner as a heat pipe. As such, the vapor chamber heats the exterior of the second tube in a more uniform manner.

A mixture of hydrocarbon fuel and steam is fed into the gap space between the first tube and the second tube. The mixture undergoes a water gas shift reaction to create reaction gases, wherein hydrogen gas is included within the reaction gases. At least some of the hydrogen gas permeates through the first tube and becomes separated from the remainder of said reaction gases. The hydrogen gas can then be utilized.

BRIEF DESCRIPTION OF THE DRAWINGS

For a better understanding of the present invention, reference is made to the following description of exemplary embodiments thereof, considered in conjunction with the accompanying drawings, in which.

DETAILED DESCRIPTION OF THE DRAWINGS

The present invention is a hydrogen processor with an improved heating scheme. The hydrogen processor performs both as a steam reformer and as a purifier. The hydrogen processor reacts a hydrocarbon with steam to produce reaction gases. The hydrogen processor then acts to separate hydrogen from those reaction gases. Although the hydrogen processor can be used to generate ultrapure hydrogen for a variety of industrial applications, the present invention hydrogen processor is particularly well suited for use in generating hydrogen gas on demand for a proton exchange membrane (PEM) fuel cell. Accordingly, the exemplary embodiments of the hydrogen processors show their use with a PEM fuel cell to set forth the best modes contemplated for the design. However, it should be understood that the hydrogen processor can be used to generate ultra-pure hydrogen for other purposes.

Figure 1:
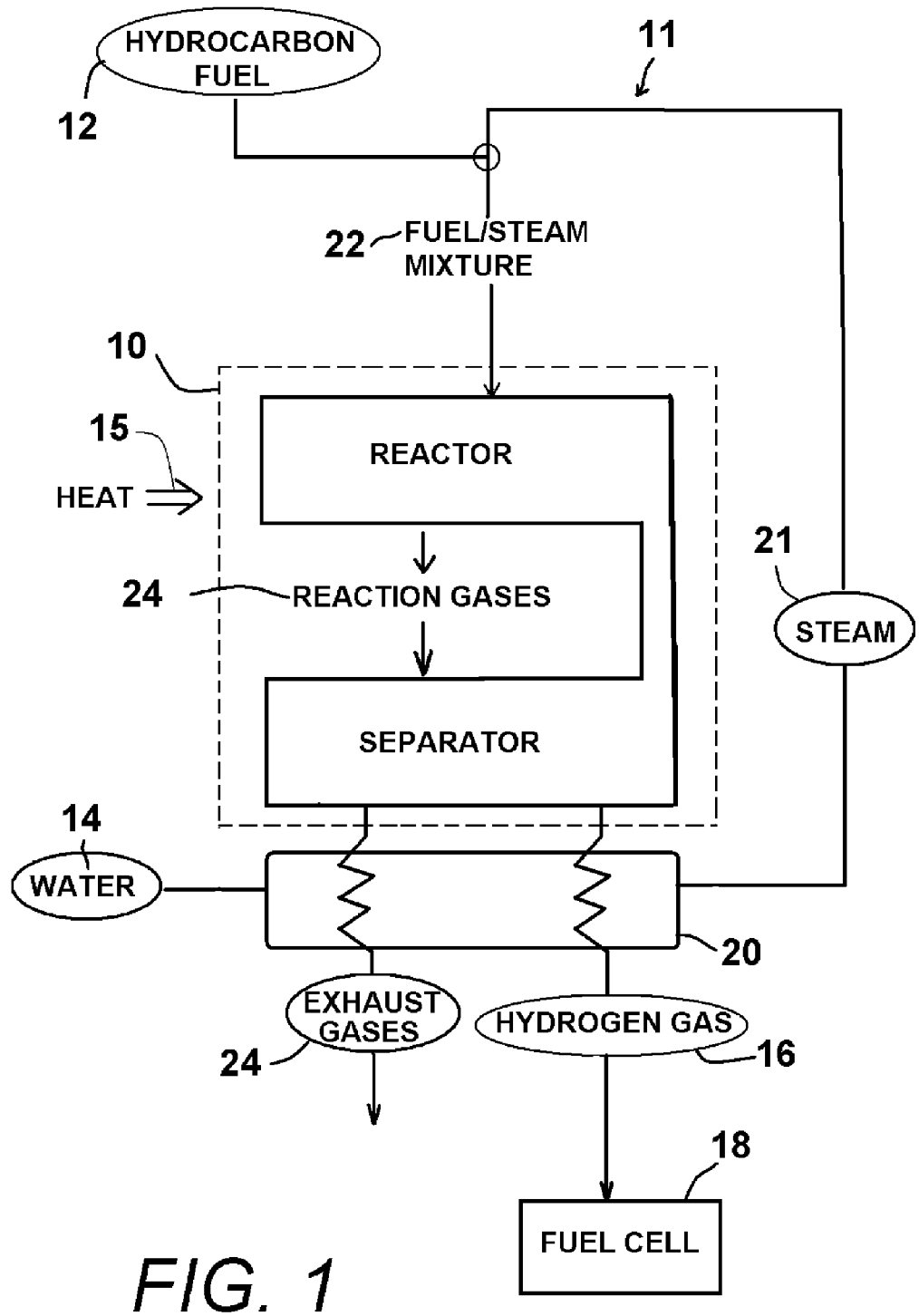
FIG. 1 is a schematic of an exemplary embodiment of a fuel cell system powered by the present invention hydrogen processor.

Referring to FIG. 1, there is shown a schematic of a system 11 that utilizes the hydrogen processor 10. The hydrogen processor 10 reacts a hydrocarbon fuel 12 and water 14 for the purpose of ultimately producing purified hydrogen gas 16 in a highly efficient manner. The hydrogen gas 16 produced is ultra-pure and is used for a secondary purpose, such as powering a PEM fuel cell 18. Alternatively, the hydrogen gas 16 can be stored by being compressed to high pressure and held in a pressurized storage tank.

The inputs to the hydrogen processor 10 are water 14, hydrocarbon fuel 12, and heat 15. The outputs of the hydrogen processor 10 are hydrogen gas 16 and exhaust gases 26. The hydrogen gas 16 and exhaust gases 26 are hot and are directed into a heat exchanger 20. The water 14 is converted to superheated steam 21 by the heat exchanger 20. The hydrocarbon fuel 12 is mixed with the superheated steam 21. Upon mixing, the hydrocarbon fuel 12 is completely vaporized and begins to react with the steam 21. This creates a fuel/steam mixture 22. The fuel/steam mixture 22 is fed into the hydrogen processor 10. Within the hydrogen processor 10, the temperature for inducing a water gas shift reaction is maintained, as will later be explained in detail.

The hydrogen processor 10 first functions as a reactor, wherein the hydrogen processor 10 produces reaction gases 24. The reaction gases 24 primarily include hydrogen ($H_2$), carbon dioxide ($CO_2$) and steam ($H_2O$). However, smaller concentrations of carbon monoxide (CO) and methane ($CH_4$) are also present. Furthermore, depending upon the type of hydrocarbon fuel 12 being used, trace amounts of hydrogen sulfate ($H_2S$) may also be present. The hydrogen processor 10 also functions as a hydrogen separator. The reaction gases 24 produced within the hydrogen processor 10 are exposed to a hydrogen permeable membrane. The hydrogen permeable membrane enables hydrogen gas 16 to be separated from the reaction gases 24.

As has been stated, the reformation process within the hydrogen processor 10 produces reaction gases 24 that contain hydrogen ($H_2$) as well as secondary exhaust gases. The reformation process requires an operating temperature of between 550 degrees Celsius and 800 degrees Celsius. The optimal operating temperature within this range depends upon factors, such as the type of hydrocarbon fuel 12 being used.

Figure 2:
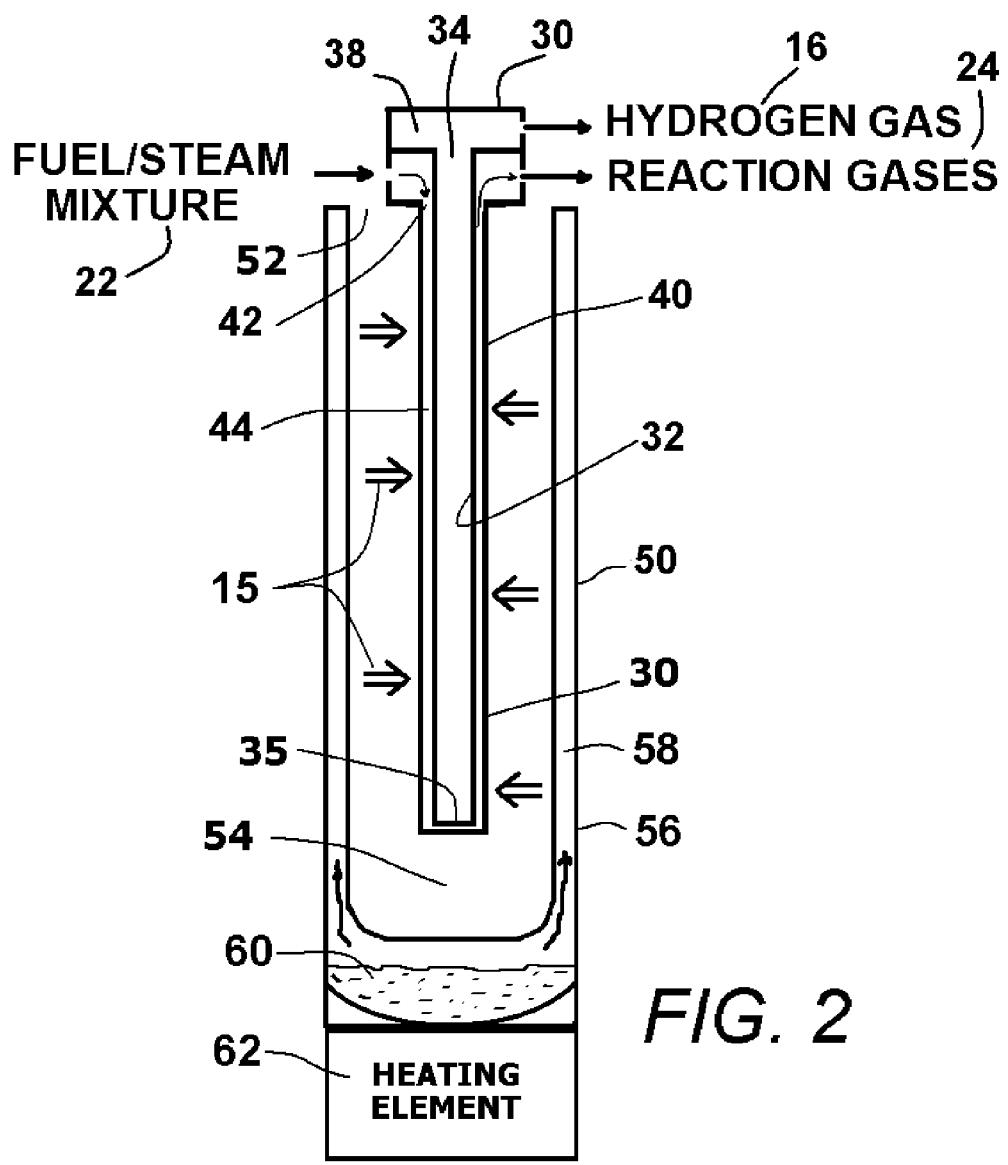
FIG. 2 is a cross-sectional view of a first exemplary embodiment of a hydrogen processor that can be used within the system of FIG. 1.

Within the hydrogen processor 10 are a plurality of reaction cells. Referring to FIG. 2 in conjunction with FIG. 1, a first exemplary embodiment of a single reaction cell 30 is shown. It will be understood that the hydrogen processor 10 may contain dozens or hundreds of such reaction cells 30. However, since all the reaction cells 30 function in the same manner, a single reaction cell 30 is shown for the purpose of simplicity and clarity.

Each reaction cell 30 contains concentric tube structures. In the center of each reaction cell 30 is a hydrogen permeable tube 32. The hydrogen permeable tube 32 is a tube made of a hydrogen permeable alloy, such as a palladium-silver alloy or a palladium-copper alloy. The hydrogen permeable tube 32 has an open first end 34 and a closed second end 35. The open first end 34 communicates with a hydrogen collection manifold 38.

A supply tube 40 surrounds the hydrogen permeable tube 32. The supply tube 40 is impermeable to hydrogen. The supply tube 40 supplies a flow of the fuel/steam mixture 22. The supply tube 40 has an open top end 42 into which the hydrogen permeable tube 32 extends. This creates a very narrow reaction gap 44 between the interior of the supply tube 40 and the exterior of the hydrogen permeable tube 32. The reaction gap 44 is very small, preferably being no larger than 5000 microns. The best size for the reaction gap 44 is between 100 microns and 1000 microns. In such a confined space, the water molecules and the fuel molecules within the fuel/steam mixture 22 undergo turbulent flow and are forced to interact, thereby inducing the water gas shift reaction to occur within the reaction gap 44.

The supply tube 40 receives the supply of the fuel/steam mixture 22 that enters the hydrogen processor 10 and directs those input gases into the reaction gap 44. As a result, the fuel/steam mixture 22 enters the open top end 42 of the supply tube 40 and is forced to flow around the hydrogen permeable tube 32 as the water gas shift reaction occurs. Heat 15 is required to induce the water gas shift reaction. Heat 15 is added to the fuel/steam mixture 22 while in the reaction gap 44, therein inducing the water gas shift reaction to begin and run to exhaustion. By spreading the fuel/steam mixture 22 very thinly throughout the available reaction gap 44, a highly efficient water gas shift reaction can be created, wherein most of the incoming fuel/steam mixture 22 is converted to less complex molecules.

To ensure a highly efficient water gas shift reaction, the heat 15 must be quickly and evenly added to the fuel/steam mixture 22 while it flows through the narrow reaction gap 44. The heat 15 is added using a tubular heat pipe structure 50. The tubular heat pipe structure 50 has an open end 52 that leads into a heating chamber 54. The supply tube 40 and the hydrogen permeable tube 32 extend down through the open end 52 and into the heating chamber 54. In the shown embodiment, the heating chamber 54 is shown being much wider than the supply tube 40. This is for demonstration purposes only. In actuality, the smallest gap possible will exists around the supply tube 40. The gap is the smallest that can be practically used in assembly. However, it will be understood that the preferred gap is so small that some direct contact will exist between the exterior of the supply tube 40 and the interior surfaces of the heating chamber 54.

The heating chamber 54 is surrounded along its sides by a hollow wall 56. Within the hollow wall 56 is a vapor chamber 58. The vapor chamber 58 also extends into the base of the tubular heat pipe structure 50. The vapor chamber 58 is isolated. Within the vapor chamber 58 is a high temperature multi-phase material 60, such as sodium, that undergoes a phase shift within the operating temperature range of between 500° C. and 800° C.

The heat pipe structure 50 is heated by a heating element 62. The heating element 62 can be electric. Alternatively, the heating element 62 can be a combustion heater that burns some of the hydrogen gas 16 or exhaust gages 26 produced by the hydrogen processor 10. As the heating element 62 heats the multi-phase material 60, a phase shift occurs, wherein the temperature within the vapor chamber 58 is maintained within the phase transition temperature range of the multi-phase material 60 being used. The heat pipe structure 50 transfers heat from the heating element 62 to the length of the reaction cell 30. The heat pipe structure 50 extends along the length of the reaction cell 30 and maintains the reaction cell 30 at a relatively constant temperature. This maintains the reaction cell 30 at the operating temperature needed to heat the water gas shift reaction occurring in the reaction gap 44 inside the reaction cell 30.

It will be understood that as the fuel/steam mixture 22 enters the supply tube 40. The fuel/steam mixture 22 is forced to flow down through the reaction gap 44 where it is thinned and heated. The fuel/steam mixture 22 is forced to pass through the ultra-small reaction gap 44 between the interior of the supply tube 40 and the exterior of the hydrogen permeable tube 32. The fuel/steam mixture 22 undergoes a water gas shift reaction to produce the reaction gases 24. Hydrogen gas 16 is contained within the reaction gases 24. The hydrogen gas 16 permeates through the hydrogen permeable tube 32 and is collected for use.

Figure 3:
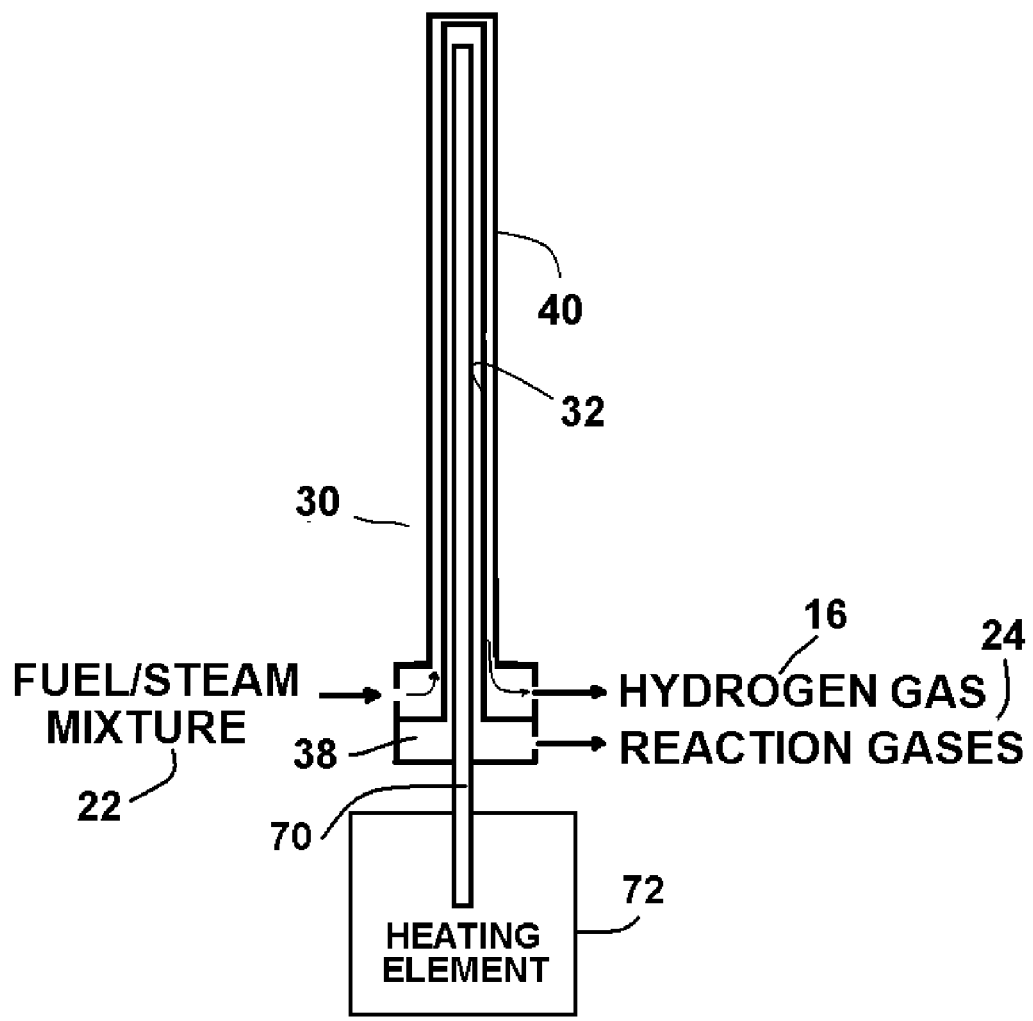
FIG. 3 is a cross-sectional view of an alternate exemplary embodiment of a hydrogen processor that can be used within the system of FIG. 1.

Referring to FIG. 3, an alternate embodiment of the present invention system is shown. In the earlier embodiment, a heat pipe structure was created outside the reaction cell. In the embodiment of FIG. 3, a heat pipe is used to internally heat a reaction cell.

The reaction cell 30 has the same structure as the reaction cell 30 of the previous embodiment. As such, the same reference numbers are used. In this embodiment, a heat pipe 70 is provided that extends through the manifold 38 and into the center of the hydrogen permeable tube 32. The heat pipe 70 transfers heat from an external heating element 72 into the center of the reaction cell 30. In this manner, the reaction cell 30 is internally heated to its operating temperature.

The embodiments of the hydrogen processor described and illustrated are merely exemplary and a person skilled in the art can make many changes using functionally equivalent configurations. All such variations, modifications, and alternate embodiments are intended to be included within the present invention as defined by the claims.

What is claimed is:

1. A method of producing hydrogen from a mixture of hydrocarbon fuel and steam, said method comprising the steps of:
   providing a reaction cell that contains a first tube of hydrogen permeable material and a second tube of hydrogen impermeable material concentrically positioned so that a gap space exists between said first tube and said second tube;
   providing a heating element;
   providing a heat pipe that has a tubular section and a heating chamber defined within said tubular section, wherein said heat pipe is heated by said heating element and said heat pipe transfers heat from said heating element to said heating chamber;
   positioning at least a portion of said reaction cell within said heating chamber of said heat pipe, wherein said heating chamber heats said gap space within said reaction cell;
   introducing said mixture of said hydrocarbon fuel and steam into said gap space, wherein said mixture undergoes a water gas shift reaction to create reaction gases, wherein hydrogen gas is included within said reaction gases;
   wherein at least some of said hydrogen gas permeates through said first tube and becomes separated from a remainder of said reaction gases.

2. The method according to claim 1, wherein said tubular section of said heat pipe concentrically surrounds said reaction cell.

3. The method according to claim 1, wherein said heat pipe has hollow walls that surround said heating chamber, wherein a portion of a vapor chamber is defined within said hollow walls.

4. The method according to claim 3, wherein said a multi-phase material is disposed within said vapor chamber.

5. The method according to claim 1, wherein said step of providing a heating element includes providing a combustion heating element.

6. The method according to claim 1, wherein said step of providing a heating element includes providing an electric heating element.

7. The method according to claim 1, wherein said first tube is concentrically positioned within said second tube.

8. The method according to claim 1, wherein said second tube is concentrically positioned within said first tube.

9. A method of producing hydrogen from a mixture of hydrocarbon fuel and steam, said method comprising the steps of:
   providing a first tube of hydrogen permeable material;
   providing a second tube of hydrogen impermeable material concentrically around said first tube so that a gap space exists between said first tube and said second tube;
   providing a sealed vapor chamber that surrounds said second tube, wherein said vapor chamber contains a volume of a multi-phase material trapped therein, wherein said multi-phase material changes phase within an operating temperature range;
   providing a heating element that heats said vapor chamber, wherein said vapor chamber heats said second tube and maintains said second tube within said operating temperature range; and
   introducing said mixture of said hydrocarbon fuel and steam into said gap space, wherein said mixture undergoes a water gas shift reaction to create reaction gases within said gap space, wherein hydrogen gas is included within said reaction gases;
   wherein at least some of said hydrogen gas permeates through said first tube and is separated from said reaction gases.

10. The method according to claim 9, wherein said vapor chamber concentrically surrounds said second tube.

11. The method according to claim 9, wherein said step of providing a heating element includes providing a heating element heated by combustion.

12. The method according to claim 9, wherein said step of providing a heating element includes providing an electric heating element.

13. A method of heating a reaction cell, said method comprising the steps of:
- providing a first tube of hydrogen permeable material;
- providing a second tube of hydrogen impermeable material concentrically inside said first tube so that a gap space exists between said first tube and said second tube;
- surrounding said second tube with a sealed vapor chamber that contains a multi-phase material trapped therein, wherein said multi-phase material changes phase within a predetermined temperature range;
- heating said vapor chamber to said predetermined temperature range with a heating element.

14. The method according to claim 13, wherein said vapor chamber concentrically surrounds said reaction cell.

\* \* \* \* \*